United States Patent [19]

Lowery, Sr. et al.

[11] Patent Number: 4,496,407
[45] Date of Patent: Jan. 29, 1985

[54] APPARATUS AND PROCESS FOR ULTRASONICALLY CUTTING OFF PREDETERMINED WIDTHS OF SELVAGES AND SEALING THE CUT EDGES OF TEXTILE FABRIC

[75] Inventors: Jack R. Lowery, Sr., Lancaster; George L. Payet, Fort Mill, both of S.C.

[73] Assignee: Springs Industries, Inc., Fort Mill, S.C.

[21] Appl. No.: 555,451

[22] Filed: Nov. 28, 1983

[51] Int. Cl.³ ..................... B29C 27/08; B32B 31/18
[52] U.S. Cl. ........................... 156/73.3; 156/88; 156/251; 156/207; 156/353; 156/361; 156/515; 156/580.1
[58] Field of Search ............ 156/73.1, 73.2, 73.3, 156/88, 251, 267, 515, 580.1, 580.2, 361, 353

[56] References Cited

U.S. PATENT DOCUMENTS

| | | | |
|---|---|---|---|
| 2,633,894 | 4/1953 | Carwile | 156/73.5 |
| 3,378,429 | 4/1968 | Obeda | 156/515 |
| 3,419,447 | 12/1968 | Hewitt | 156/73.3 |
| 3,445,307 | 5/1969 | Balamuth et al. | 156/73.4 |
| 3,657,033 | 4/1972 | Sager | 156/73.3 |
| 3,666,599 | 5/1972 | Obeda | 156/538 |
| 3,679,526 | 7/1972 | Horton | 83/202 |
| 3,737,361 | 6/1973 | Obeda | 156/580.1 |
| 3,939,033 | 2/1976 | Grgach et al. | 156/515 |
| 4,090,897 | 5/1978 | Minick | 156/73.1 |
| 4,097,327 | 6/1978 | Calemard | 156/515 |
| 4,222,809 | 9/1980 | McLean et al. | 156/267 |

Primary Examiner—Michael Wityshyn
Attorney, Agent, or Firm—Bell, Seltzer, Park & Gibson

[57] ABSTRACT

Apparatus and process for ultrasonically cutting off undesirable selvage and sealing the longitudinal cut edges from both sides of continuous lengths of textile fabric having at least some thermoplastic yarns therein. The apparatus and process are characterized by cutting off a predetermined width of the undesirable selvage from each side of the textile fabric regardless of the transverse variations in the path of travel of the fabric through the apparatus or width of the fabric. The apparatus utilizes a mechanism for shifting the moving textile fabric relative to a stationary ultrasonic cutting and sealing mechanism on one longitudinal edge of the fabric and a mechanism for shifting a movable ultrasonic cutting and edge sealing mechanism relative to the other longitudinal edge of the moving textile fabric.

7 Claims, 4 Drawing Figures

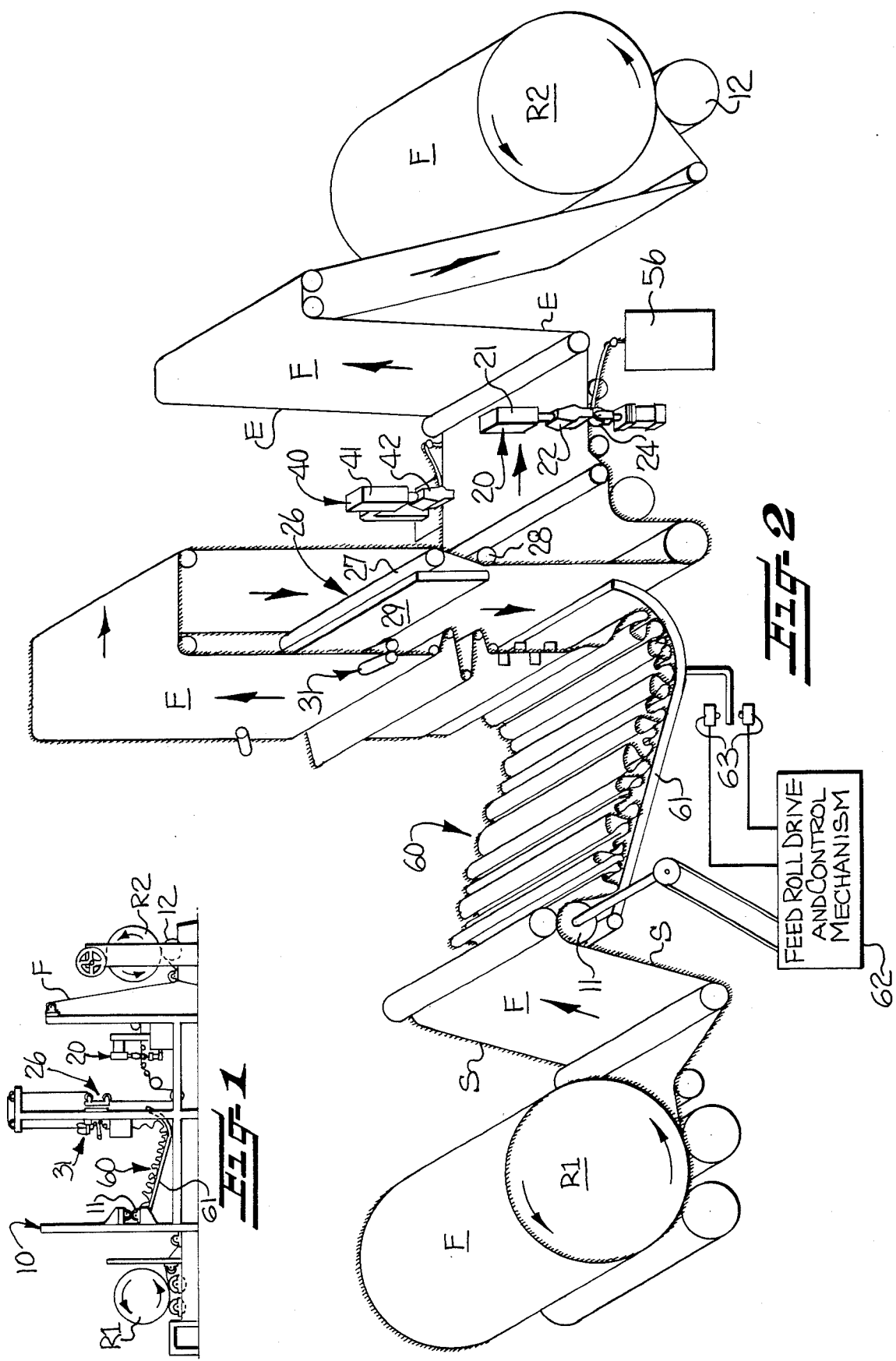

APPARATUS AND PROCESS FOR ULTRASONICALLY CUTTING OFF PREDETERMINED WIDTHS OF SELVAGES AND SEALING THE CUT EDGES OF TEXTILE FABRIC

FIELD OF THE INVENTION

This invention relates to an appratus and process for ultrasonically cutting off undesirable selvages and sealing the longitudinal cut edges from both sides of continuous lengths of textile fabric having at least some thermoplastic yarns therein. The apparatus and process are characterized by cutting off a predetermined width of the undesirable selvage from each side of the textile fabric regardless of transverse variations in the path of travel of the fabric through the apparatus or width of the fabric.

BACKGROUND OF THE INVENTION

In fabricating products from continuous lengths of textile fabric, it is often necessary to cut off predetermined amounts of undesirable selvage from each of the longtudinal side edge portions of the textile fabric. This is particularly true when textile fabric is woven on air jet looms or the like which produce fringed selvages along the longitudinal side edges which are not desirable in the fabricated end products, such as bed sheets, piece goods or the like. Accordingly, such undesirable selvages must be cut off of each longitudinal side edge in predetermined widths and the cut side edges must be sealed, which is usually done by hemming or the like, to prevent raveling at the cut edges.

Apparatus has been developed for ultrasonically cutting and edge sealing thermofusible material. For the most part, such apparatus has primarily been utilized with all plastic or thermoplastic sheet materials. However, such apparatus has been proposed for cutting and edge sealing textile fabrics having at least some thermoplastic yarns therein and is advantageous for a number of reasons compared to conventional cutting and hemming operations. An example of an apparatus for this purpose is disclosed in U.S. Pat. No. 4,097,327, issued June 27, 1978. In that patent, ultrasonic cutting and edge sealing mechanisms are illustrated in FIG. 1 thereof as mounted stationary on a loom or as a separate cutting machine for on-the-loom or off-the-loom ultrasonic cutting and edge sealing. However, in either operation, if the width of the textile fabric varies or if transverse variations occur in the path of travel of the textile fabric, different widths of selvages will be removed from each longitudinal side edge portion of the textile fabric since the ultrasonic cutting and edge sealing devices are mounted stationary. The result will be that all of the undesirable selvage on each longitudinal edge of the textile fabric may not be removed with this arrangement.

OBJECT AND SUMMARY OF THE INVENTION

Accordingly, it is the object of this invention to provide an apparatus and process for ultrasonically cutting off undesirable selvage and sealing the longitudinal cut edges of continuous lengths of textile fabric having at least some thermoplastic fibers therein and which will cut off a predetermined width of the undesirable selvage from each side edge of the textile fabric regardless of transverse variations in the path of travel of the fabric through the apparatus or width of the fabric.

By this invention, it has been found that the above object may be accomplished by providing an apparatus and process including the following.

Feeding devices are provided for feeding the textile fabric in a longitudinal path of travel through the apparatus.

A first ultrasonic cutting and sealing mechanism is mounted in the apparatus for receiving one side edge of the moving textile fabric and for cutting off undesirable selvage and simultaneously sealing the cut edge along the one side edge. A device is mounted in the apparatus in the path of travel of the textile fabric through the apparatus for aligning the one side edge of the moving textile fabric and the first ultrasonic cutting and sealing mechanism so that a predetermined width of the undesirable selvage will be cut off from the one side edge of the textile fabric. A second ultrasonic cutting and sealing mechanism is mounted in the apparatus for receiving the other side edge of the moving textile fabric and for cutting off undesirable selvage and simultaneously sealing the cut edge along the other side edge. A device is mounted in the apparatus in the path of travel of the textile fabric through the apparatus for aligning the other side edge of the moving textile fabric and the second ultrasonic cutting and sealing mechanism so that a predetermined width of the undesirable selvage will be cut off from the other side of the textile fabric.

The preferred apparatus and process for accomplishing the above object includes the following. The first ultrasonic cutting and sealing mechanism is mounted in a stationary position in the apparatus. The device for aligning the one side edge of the moving textile fabric and the first ultrasonic cutting and sealing mechanism is positioned in advance of the first ultrasonic cutting and sealing mechanism in the path of travel of the textile fabric and transversely shifts the moving textile fabric to align the one side edge of the textile fabric with the first stationary ultrasonic mechanism so that a predetermined width of the undesirable selvage will be cut off from the one side edge. The second ultrasonic cutting and sealing mechanism is mounted in the apparatus after the textile fabric shifting device and is mounted for movement in a direction transverse to the moving textile fabric. The device for aligning the other side edge of the moving textile fabric and the second ultrasonic cutting and sealing mechanism is connected with the second ultrasonic mechanism for transversely shifting the second ultrasonic mechanism to align the second ultrasonic mechanism with the other side edge of the moving textile fabric so that a predetermined width of the undesirable selvage will be cut off from the other side edge of the textile fabric.

Although more expensive from an equipment cost standpoint, an alternative to the above discussed preferred apparatus and process for accomplishing the above descibed object would be to mount both ultrasonic cutting and slitting mechanisms for movement in directions transverse to the moving textile fabric. The respective aligning mechanisms would individually move and align the respective ultrasonic mechanisms with the respective side edges of the moving textile fabric so that predetermined widths of the undesirable selvages will be cut off from each side of the moving textile fabric regardless of transverse shifting of the textile fabric in its path of travel or variations in the width of the textile fabric.

BRIEF DESCRIPTION OF THE DRAWINGS

Some of the objects and advantages of this invention have been set forth above, other objects and advantages of the invention will become apparent in the detailed description to follow when taken in conjunction with the accompanying drawings, in which:

FIG. 1 is a side elevational view of an apparatus constructed in accordance with this invention;

FIG. 2 is a schematic, perspective view of the apparatus of FIG. 1 with the frame and other parts removed for clarity;

DETAILED DESCRIPTION OF PREFERRED EMBODIMENT OF THE INVENTION

Figures 3, 4:
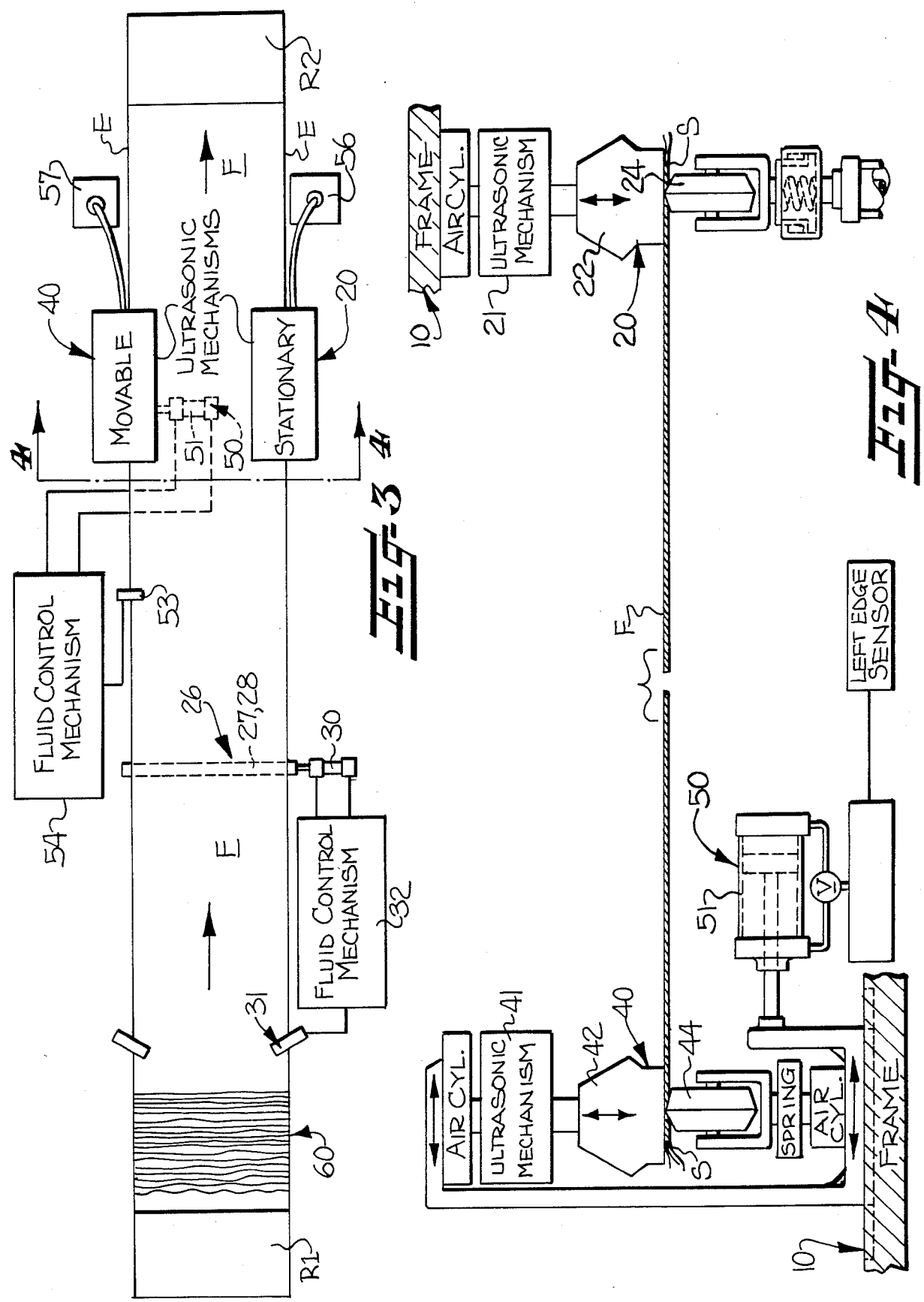
FIG. 3 is a schematic, plan view, somewhat in block diagram form, of the apparatus illustrated in FIG. 2.
FIG. 4 is a schematic, sectional view, taken generally along the line 4—4 of FIG. 3.

Referring now to the drawings, the preferred apparatus for ultrasonically cutting off undesirable selvage S and sealing the longitudinal cut edges E of continuous lengths of textile fabric F having at least some thermoplastic fibers or yarns therein is illustrated in the form of a separate machine, as shown particularly in FIG. 1. This machine receives the textile fabric F from a supply roll R1, performs the above operations thereon and takes up the textile fabric F on a takeup roll R2. This machine would thus be considered an off-the-loom ultrasonic cutting and sealing apparatus. However, it is to be understood that the novel features of the apparatus of this invention could be utilized in other environments and is not intended to be limited to the particular machine illustrated herein and described hereinafter.

The apparatus of this invention includes a frame means 10 which may constitute a plurality of separate or interconnected frame members, all collectively indicated by the reference numeral 10, for mounting and carrying the various elements of the apparatus, to be described below. The apparatus also includes means carried by the frame means 10 for feeding the textile fabric F in a longitudinal path of travel of a desired configuration through the apparatus. This means includes at least driven feed roll 11 for feeding the fabric from supply roll R1 and driven roll 12 for rotating the takeup roll R2. There are other rolls illustrated, particularly in FIG. 2, for feeding the continuous length of textile fabric F and guiding such textile fabric F in the desired configuration of its longitudinal path of travel through the apparatus. Other of these rolls may be driven, as desired.

The preferred apparatus further includes first ultrasonic cutting and sealing means, generally indicated at 20, mounted in a stationary position on the apparatus frame 10. The ultrasonic cutting and sealing means 20, as understood by those with ordinary skill in the art, includes transducer and booster mechanisms 21 which convert an electrical signal from a power supply to mechanical vibration and boost such mechanical vibration, a sonic horn 22 connected to the transducer and booster 21 and which vibrates up and down as a result of the boosted vibrational energy produced by the transducer and booster 21. Cooperating with the sonic horn 22 is an anvil 24 which is mounted below the sonic horn 22 for receiving one side edge of the moving textile fabric F between the anvil 24 and the horn 22 for cutting off undesirable selvage S and simultaneously sealing the cut edge E along the one side edge of the fabric F.

Normal operation of such ultrasonic cutting and sealing means are well known to those with ordinary skill in the art. However, further details of the construction and operation of improved ultrasonic cutting and sealing mechanisms which may be utilized in the apparatus of this invention are disclosed in copending applications Ser. Nos. 555,664 and 576,889, assigned to the assignee of the present applicati on.

The apparatus further includes means 26 mounted on the apparatus frame 10 in advance of the first ultrasonic cutting and sealing means 20 in the path of travel of the textile fabric F through the apparatus for transverse shifting of the moving textile fabric F to align the one side of the textile fabric F with the stationary ultrasonic cutting and sealing means 20 so that a predetermined width of the undesirable selvage S will be cut off from the one side of the textile fabric F. This texile fabric shifting means 26 may include any suitable mechanism and is preferably in the form of a friction roll device including friction rolls 27, 28 rotatably mounted on a base 29 carried in a suitable carriage (not shown) on the apparatus frame 10 for movement back and forth transversely of the longitudinal path of travel of the textile fabric F through the apparatus. As may be seen in FIG. 2, the fabric F passes over the roll 27 and under the roll 28 and is in frictional engagement therewith so that transverse movement of the rolls 27, 28 will carry the textile fabric therewith and transversely shift the textile fabric F.

The fabric shifting means 26 further includes drive means, preferably in the form of a fluid-operated double-acting piston and cylinder 30 (see FIG. 3) mounted on the apparatus frame 10 and connected with the base 29 of the friction rolls 27, 28 for being actuated to move the friction rolls 27, 28 back and forth predetermined distances. The textile fabric shifting means also includes means 31 mounted on the apparatus frame 10 in advance of the friction rolls 27, 28 in the path of travel of the textile fabric F for sensing the position of the one side edge of the moving textile fabric F and for actuating the drive means 30. This sensing means 31 may be any suitable type of edge sensing means including a fluid control mechanism 32 which controlls the flow of fluid to each side of the double-acting piston and cylinder 30 for moving the friction rolls 27, 28 predetermined distances back and forth in a transverse direction of the path of travel of the fabric F. Many types of edge sensing and control means are commercially available and well known to those with ordinary skill in the art and further explanation and details herein is not necessary.

The apparatus further includes a second ultrasonic cutting and sealing means 40 mounted on the apparatus frame 10 after the textile fabric shifting means 26 in the path of travel of the textile fabric F for movement in a direction transverse to the moving textile fabric F. The second movable ultrasonic cutting and sealing means 40 includes the same basic components as the first stationary ultrasonic cutting and sealing means 20 including transducer and booster 41, sonic horn 42 and anvil 44. The second ultrasonic cutting and sealing means 40 receives the other side edge of the moving textile fabric F and cuts off undesirable selvage S and simultaneously seals the cut edge E along the other side edge. The second ultrasonic cutting and sealing means 40 may be mounted for movement transversely of the moving textile fabric F by any suitable carriage arrangement (not shown) carried by the apparatus frame 10.

The apparatus further includes means 50 mounted on the apparatus frame 10 and connected with the second ultrasonic cutting and sealing means 40 for transverse shifting of the second ultrasonic cutting and sealing means 40 to align the second ultrasonic cutting and sealing means 40 with the other side edge of the moving textile fabric F so that a predetermined width of the undesirable selvage S will be cut off from the other side of the textile fabric F regardless of transverse shifting of the textile fabric F by the fabric shifting means 26 or variations in width of the textile fabric F.

Such means 50 includes drive means 51, preferrably in the form of a fluid-operated double-acting piston and cylinder, connected with the second ultrasonic cutting and sealing means 40 for being actuated to move the second ultrasonic cutting and sealing means back and forth predetermined distances. The means 50 further includes edge sensing means 53 mounted on the apparatus frame 10 between the second ultrasonic cutting and sealing means 40 and the textile fabric shifting means 26 in the path of travel of the textile fabric F for at least sensing the position of the other side of the moving textile fabric F and actuating the drive means 50 through a fluid control mechanism 54.

Thus, it may be seen that as the textile fabric F travels through the apparatus of this invention in its longitudinal path of travel, generally illustrated in FIGS. 1, 2 and 3, it will pass the first edge sensing means 31 for sensing the position of the one side edge of the textile fabric F and for actuating the textile fabric shifting means 26 to align the one side edge of the textile fabric F with the first stationary ultrasonic cutting and sealing means 20. Such first ultrasonic cutting and sealing means 20 will cut off a predetermined width of undesirable selvage S from the one side of the textile fabric F while simultaneouly sealing the cut edge E along the one side of the textile fabric F. After passing the fabric shifting means 26, the other side edge of the textile fabric F will be sensed by edge sensing means 53 which will actuate shifting mechanism 50 for transverse movement of the second movable ultrasonic cutting and sealing means 40 to align the second ultrasonic cutting and sealing means 40 with the other side edge of the textile fabric F, regardles of whether the fabric F has been shifted by the fabric shifting means 26 or whether variations occur in the width of the textile fabric F, for cutting off a predetermined width of undesirable selvage S from the other side of the textile fabric F and simultaneously sealing the cut edge E along the other side of the textile fabric F.

The apparatus further includes cut selvage removal mechanisms, generally indicated at 56, 57 for taking up the respective cut selvages S after cutting by the ultrasonic mechanisms 20, 40. Preferably, these selvage removal mechanisms 20, 40 would be in the form of vacuum devices since such systems put an ideal amount of tension on the selvages S. However, it is possible to remove such cut selvages S by a reel or other types of mechanisms which would provide the proper tension on such selvages S.

To aid in transverse shifting of the textile fabric F by the fabric shifting means 26 to align the one edge of the textile fabric F with the first stationary ultrasonic cutting and sealing means 20, there is preferably provided a scray means 60 mounted on the apparatus frame 10 between the initial textile fabric feeding means 11 and the textile fabric shifting means 26 in the path of travel of the textile fabric F for receiving and maintaining a predetermined excess amount of the textile fabric F fed into the apparatus by the initial feeding means 11 in a generally tensionless condition. The scray means 60 includes a conventionally-shaped scray 61 which is pivotably mounted for receiving the textile fabric F from the initial feeding roll means 11 and for pivoting up and down under the weight of the textile fabric F received therein. The scray 61 actuates suitable drive and control means 62 by electric switches 63 or the like for actuating and deactuating feeding rotation of the initial textile fabric feed roll 11. By this arrangement, when a sufficient amount of fabric has been received in the scray 61, the drive and control means 62 will be deactuated stopping the rotation of the feed roll 11 and when a predetermined amount of fabric F has been fed from the scray 61, the drive and control means 62 will actuate the feed roll 11 to feed additional textile fabric into the scray 61. Therefore, a predetermined excess amount of textile fabric F will be maintained in the scray means 60.

In the drawings and specification there has been set forth a preferred embodiment of the invention, but it is to be understood that the invention is not limited thereto and may be embodied and practiced in other ways within the scope of the following claims.

What is claimed is:

1. An apparatus for ultrasonically cutting off undesirable selvage and sealing the longitudinal cut edges of continuous lengths of textile fabric having at least some thermoplastic fibers therein and being characterized by a construction designed to cut off a predetermined width of the undersirable selvage from each side edge of the textile fabric regardless of transverse variations in the path of travel of the fabric through the apparatus or width of the fabric, said apparatus comprising frame means;

means carried by said frame means for feeding the textile fabric in a longitudinal path of travel through said apparatus;

first ultrasonic cutting and sealing means mounted in a stationary position on said frame means for receiving one side edge of the moving textile fabric and for cutting off undesirable selvage and simultaneously sealing the cut edge along the one side edge;

means mounted on said frame means in advance of said first ultrasonic cutting and sealing means in the path of travel of the textile fabric through said apparatus for transverse shifting of the moving textile fabric to align the one side edge of the textile fabric with said first stationary ultrasonic cutting and sealing means so that a predetermined width of the undesirable selvage will be cut off from the one side edge;

second ultrasonic cutting and sealing means mounted on said frame means after said textile fabric shifting means in the path of travel of the textile fabric for movement in a direction transverse to the moving textile fabric and for receiving the other side edge of the moving textile fabric and for cutting off undesirable selvage and simultaneously sealing the cut edge along the other side edge; and means mounted on said frame means and connected with said second ultrasonic cutting and sealing means for transverse shifting of said second ultrasonic cutting and sealing means to align said second ultrasonic cutting and sealing means with the other side edge of the moving textile fabric so that a predetermined width of the undesirable selvage will be cut off from the other side edge of the textile fabric regardless of transverse shifting of the textile fabric by said fabric shifting means or variations in the width of the textile fabric.

2. An apparatus, as set forth in claim 1, in which said textile fabric shifting means comprises friction roll means transversely engaging the moving textile fabric and mounted on said frame means for movement transversely of the path of travel of the textile fabric for shifting the textile fabric therewith;

fluid-operated, double-acting piston and cylinder means mounted on said frame means and connected with said friction roll means for being actuated to move said friction roll means back and forth predetermined distances, and means mounted on said frame means in advance of said friction roll means in the path of travel of the textile fabric for sensing the position of the one side edge of the moving textile fabric and for actuating said piston and cylinder means.

3. An apparatus, as set forth in claim 1, in which said means for shifting said second ultrasonic cutting and sealing means comprises fluid-operated, double-acting piston and cylinder means mounted on said frame means and connected with said second ultrasonic cutting and sealing means for being actuated to move said second ultrasonic cutting and sealing means back and forth predetermined distances, and means mounted on said frame means between said second ultrasonic cutting and sealing means and said textile fabric shifting means in the path of travel of the textile fabric for sensing the position of the other side of the moving textile fabric and for actuating said piston and cylinder means.

4. An apparatus for ultrasonically cutting off undesirable selvage and sealing the longitudinal cut edges of continuous lengths of textile fabric having at least some thermoplastic fibers therein and being characterized by a construction designed to cut off a predetermined width of the undesirable selvage from each side edge of the textile fabric regardless of transverse variations in the path of travel of the fabric through the apparatus or width of the fabric, said apparatus comprising frame means;

means carried by said frame means for feeding the textile fabric in a longitudinal path of travel through said apparatus;

first ultrasonic cutting and sealing means mounted in a stationary position on said frame means for receiving one side edge of the moving textile fabric and for cutting off undesirable selvage and simultaneously sealing the cut edge along the one side edge;

means mounted on said frame means in advance of said first ultrasonic cutting and sealing means in the path of travel of the textile fabric through said apparatus for transverse shifting of the moving textile fabric to align the one side edge of the textile fabric with said stationary ultrasonic cutting and sealing means so that a predetermined width of the undesirable selvage will be cut off from the one side edge, said textile fabric shifting means comprising friction roll means transversely engaging the moving textile fabric and mounted on said frame means for movement transversely of the path of travel of the textile fabric for shifting the textile fabric therewith, drive means mounted on said frame means and connected with said friction roll means for being actuated to move said friction roll means back and forth predetermined distances, and means mounted on said frame means in advance of said friction roll means in the path of travel of the textile fabric for sensing the position of the one side edge of the moving textile fabric and for actuating said drive means;

second ultrasonic cutting and sealing means mounted on said frame means after said textile fabric shifting means in the path of travel of the textile fabric for movement in a direction transverse to the moving textile fabric and for receiving the other side edge of the moving textile fabric and for cutting off undesirable selvage and simultaneously sealing the cut edge along the other side edge; and means mounted on said frame means and connected with said second ultrasonic cutting and sealing means for transverse shifting of said second ultrasonic cutting and sealing means to align said second ultrasonic cutting and sealing means with the other side edge of the moving textile fabric so that a predetermined width of the undesirable selvage will be cut off from the other side edge of the textile fabric regardless of transverse shifting of the textile fabric by said fabric shifting means or variations in the width of the textile fabric; said means for shifting said second ultrasonic cutting and sealing means comprises drive means connected with said second ultrasonic cutting and sealing means for being actuated to move said second ultrasonic cutting and sealing means back and forth predetermined distances, and means mounted on said frame means between said second ultrasonic cutting and sealing means and said textile fabric shifting means in the path of travel of the textile fabric for sensing the position of the other side of the moving textile fabric and for actuating said drive means.

5. An apparatus, as set forth in claim 1 or 4, in which said textile fabric feeding means includes driven feeding means positioned in advance of said textile fabric shifting means for being actuated to initially feed the textile fabric into said apparatus, and said apparatus further includes scray means mounted on said frame means between said initial textile fabric feeding means and said textile fabric shifting means in the path of travel of the textile fabric for receiving and maintaining a predetermined excess amount of the textile fabric fed into said apparatus by said initial feeding means in a generally tensionless condition for aiding in transverse shifting of the textile fabric by said shifting means, said scray means being mounted for movement up and down under the weight of the textile fabric received therein and including means connected to said textile fabric initial feeding means for actuating and deactuating said textile fabric initial feeding means in relation to the amount of textile fabric in said scray means and the position of said scray means.

6. Process for ultrasonically cutting off undesirable selvages and sealing the longitudinal cut edges of moving continuous lengths of textile fabric having at least some thermoplastic fibers therein and being characterized by cutting off a predetermined width of the undesirable selvage from each side of the moving textile fabric regardless of transverse variations in the path of travel of the fabric or width of the fabric, said process comprising feeding the textile fabric in a longitudinal path of travel;

cutting off undersirable selvage and simultaneously sealing the cut edge along one side edge of the moving textile fabric by the use of a stationary ultrasonic mechanism as the fabric is fed thereby;

transversely shifting the moving textile fabric in advance of the stationary ultrasonic mechanism to align the one side edge of the fabric in a predetermined position with the stationary ultrasonic mechanism so that a desired width of the undesirable selvage will be cut off from the one side edge;

thereafter cutting off undesirable selvage and simultaneously sealing the cut edge along the other side edge of the moving textile fabric by the use of a transversely movable ultrasonic mechanism as the fabric is fed thereby; and transversely shifting the movable ultrasonic mechanism into a predetermined position relative to the path of travel of the fabric past the movable ultrasonic mechanism so that a desired width of the undesirable selvage will be cut off from the other side edge.

7. Process, as set forth in claim 6, further including sensing of the position of the one edge of the textile fabric in advance of transverse shifting of the textile fabric and controlling such shifting of the fabric relative to the sensed position, and sensing of the position of the other edge of the textile fabric in advance of the transverse shifting of the movable ultrasonic mechanism and controlling such shifting of the movable ultrasonic mechanism relative to the sensed position.

* * * * *